United States Patent
Malabad et al.

(10) Patent No.: US 11,631,018 B2
(45) Date of Patent: Apr. 18, 2023

(54) PERFORMING ENHANCED EXCEPTION PROCESSING USING COGNITIVE AUTOMATION TOOLS

(71) Applicant: Bank of America Corporation, Charlotte, NC (US)

(72) Inventors: Christine Malabad, Charlotte, NC (US); Jeffrey R. Goertz, Liberty, MO (US); Letishia R. Hunt, Charlotte, NC (US); Clement Chellaraj, Charlotte, NC (US); Eric Dryer, Charlotte, NC (US); Clarence E. Lee, Charlotte, NC (US); Charles Christopher Harbinson, Mooresville, NC (US); Verlon S. Watson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 382 days.

(21) Appl. No.: 16/889,242

(22) Filed: Jun. 1, 2020

(65) Prior Publication Data

US 2021/0374575 A1   Dec. 2, 2021

(51) Int. Cl.
*G06N 5/00*   (2006.01)
*G06N 5/043*   (2023.01)
*G06N 20/00*   (2019.01)
*G06Q 40/02*   (2023.01)
*G06Q 20/10*   (2012.01)
(Continued)

(52) U.S. Cl.
CPC ............. *G06N 5/043* (2013.01); *G06N 20/00* (2019.01); *G06Q 10/06316* (2013.01); *G06Q 10/10* (2013.01); *G06Q 20/1085* (2013.01); *G06Q 40/02* (2013.01); *G06Q 20/042* (2013.01)

(58) Field of Classification Search
CPC .... G06N 5/043; G06N 20/00; G06Q 20/4016; G06Q 20/405; G06Q 10/10; G06Q 10/06316; G06Q 20/0242; G06Q 20/1085; G06Q 40/02
See application file for complete search history.

(56) References Cited

U.S. PATENT DOCUMENTS

| | | | | |
|---|---|---|---|---|
| 5,917,489 A | * | 6/1999 | Thurlow | G06F 40/35 |
| | | | | 715/810 |
| 2015/0120517 A1 | * | 4/2015 | Smith | G06Q 20/108 |
| | | | | 705/30 |

(Continued)

*Primary Examiner* — Scott S Trotter
(74) *Attorney, Agent, or Firm* — Banner & Witcott, Ltd.

(57) ABSTRACT

Aspects of the disclosure relate to performing enhanced exception processing using cognitive automation tools. In some embodiments, a computing platform may receive interaction data identifying one or more actions performed by one or more users in resolving a plurality of exception items associated with an exception queue. Subsequently, the computing platform may train, using a learning engine, a machine learning model to resolve a first exception and a second exception of one or more exceptions based on the interaction data. Based on training the machine learning model, the computing platform may generate one or more configuration commands directing a processing module to implement the machine learning model to process additional exception items associated with the exception queue. The computing platform then may send the one or more configuration commands to the processing module.

19 Claims, 7 Drawing Sheets

(51) Int. Cl.
  *G06Q 10/10*     (2023.01)
  *G06Q 10/0631*   (2023.01)
  *G06Q 20/04*     (2012.01)

(56) References Cited

U.S. PATENT DOCUMENTS

| | | | |
|---|---|---|---|
| 2019/0102697 A1* | 4/2019 | Casalonga | G06N 20/00 |
| 2019/0279170 A1* | 9/2019 | Smith | G06Q 20/042 |
| 2020/0147791 A1* | 5/2020 | Safary | G06N 20/00 |
| 2020/0169954 A1 | 5/2020 | Namba et al. | |
| 2020/0169955 A1 | 5/2020 | Chang et al. | |
| 2020/0169960 A1 | 5/2020 | Dinan | |
| 2020/0169961 A1 | 5/2020 | Su et al. | |
| 2020/0169962 A1 | 5/2020 | Fakoorian et al. | |
| 2020/0169964 A1 | 5/2020 | Zhou et al. | |
| 2020/0169977 A1 | 5/2020 | Agardh | |
| 2020/0169983 A1 | 5/2020 | Fujishiro et al. | |
| 2020/0169988 A1 | 5/2020 | Wu et al. | |
| 2020/0169993 A1 | 5/2020 | Kim et al. | |
| 2020/0169998 A1 | 5/2020 | Kim et al. | |
| 2020/0170009 A1 | 5/2020 | Chae et al. | |
| 2020/0170010 A1 | 5/2020 | Luo et al. | |
| 2020/0170012 A1 | 5/2020 | Takeda et al. | |
| 2020/0170020 A1 | 5/2020 | Agiwal et al. | |
| 2020/0170033 A1 | 5/2020 | Gao et al. | |
| 2020/0170034 A1 | 5/2020 | Kim et al. | |
| 2020/0170038 A1 | 5/2020 | Park et al. | |
| 2020/0170040 A1 | 5/2020 | Ahn et al. | |
| 2020/0170041 A1 | 5/2020 | Takeda et al. | |
| 2020/0170053 A1 | 5/2020 | Griesser et al. | |
| 2020/0170062 A1 | 5/2020 | Yang et al. | |
| 2020/0170070 A1 | 5/2020 | Park et al. | |
| 2020/0170078 A1 | 5/2020 | Demeilliez et al. | |
| 2020/0170156 A1 | 5/2020 | Ohashi | |

\* cited by examiner

PERFORMING ENHANCED EXCEPTION PROCESSING USING COGNITIVE AUTOMATION TOOLS

BACKGROUND

Aspects of the disclosure relate to data processing systems, machine learning, and cognitive automation. In particular, one or more aspects of the disclosure relate to performing enhanced exception processing using cognitive automation tools.

A financial institution may configure and deploy various enterprise computer systems to receive and process cash, checks, and other items that may be presented for deposit by customers and others. In some instances deposit items may be presented electronically (e.g., as check images and/or in other electronic forms), and these enterprise computer systems may use different hardware and software tools to validate and process the received deposit items. Additional hardware and software tools may be used to identify and resolve exceptions arising from incorrect initial processing of deposit items. Conventional hardware and software tools used in processing deposit items and associated exceptions may have various limitations, however, including limited accuracy and speed at which they can perform such processing.

SUMMARY

Aspects of the disclosure provide effective, efficient, scalable, and convenient technical solutions that address and overcome the technical problems associated with processing deposit items and associated exceptions. In particular, one or more aspects of the disclosure use cognitive automation tools to perform enhanced exception processing.

In accordance with one or more embodiments, a computing platform having at least one processor, a communication interface, and memory may receive, via the communication interface, from at least one analyst user computing device, interaction data identifying one or more actions performed by one or more users of the at least one analyst user computing device in resolving a plurality of exception items associated with an exception queue. Subsequently, the computing platform may train, using a learning engine, a machine learning model to resolve a first exception of one or more exceptions based on the interaction data identifying the one or more actions performed by the one or more users of the at least one analyst user computing device in resolving the plurality of exception items associated with the exception queue. Additionally, the computing platform may train, using the learning engine, the machine learning model to resolve a second exception of the one or more exceptions based on the interaction data identifying the one or more actions performed by the one or more users of the at least one analyst user computing device in resolving the plurality of exception items associated with the exception queue, where the second exception of the one or more exceptions is different from the first exception of the one or more exceptions. Based on training the machine learning model to resolve the first exception of the one or more exceptions and training the machine learning model to resolve the second exception of the one or more exceptions, the computing platform may generate one or more configuration commands directing a processing module to implement the machine learning model to process additional exception items associated with the exception queue. Then, the computing platform may send, to the processing module, the one or more configuration commands directing the processing module to implement the machine learning model to process the additional exception items associated with the exception queue.

In some embodiments, receiving the interaction data identifying the one or more actions performed by the one or more users of the at least one analyst user computing device in resolving the plurality of exception items associated with the exception queue may include receiving a first portion of interaction data identifying one or more actions performed by the one or more users of the at least one analyst user computing device in resolving one or more check deposit exception items associated with the exception queue.

In some embodiments, receiving the interaction data identifying the one or more actions performed by the one or more users of the at least one analyst user computing device in resolving the plurality of exception items associated with the exception queue may include receiving a second portion of interaction data identifying one or more actions performed by the one or more users of the at least one analyst user computing device in resolving one or more cash deposit exception items associated with the exception queue.

In some embodiments, training the machine learning model to resolve the first exception of the one or more exceptions may include monitoring and recording a sequence of steps performed by at least one user of the at least one analyst user computing device in modifying one or more data elements of a first exception item to resolve an incorrect amount exception.

In some embodiments, training the machine learning model to resolve the first exception of the one or more exceptions may include: after monitoring and recording the sequence of steps performed by the at least one user of the at least one analyst user computing device in modifying the one or more data elements of the first exception item to resolve the incorrect amount exception, updating a trust value of a first data source from which the first exception item was received.

In some embodiments, training the machine learning model to resolve the second exception of the one or more exceptions may include monitoring and recording a sequence of steps performed by at least one user of the at least one analyst user computing device in modifying one or more data elements of a second exception item to resolve a duplicate presentment exception.

In some embodiments, training the machine learning model to resolve the second exception of the one or more exceptions may include: after monitoring and recording the sequence of steps performed by the at least one user of the at least one analyst user computing device in modifying the one or more data elements of the second exception item to resolve the duplicate presentment exception, updating a trust value of a second data source from which the second exception item was received.

In some embodiments, after sending the one or more configuration commands directing the processing module to implement the machine learning model to process the additional exception items associated with the exception queue, the computing platform may receive, at the processing module, a third exception item from the exception queue. Subsequently, the computing platform may apply, using the processing module, the machine learning model to the third exception item received from the exception queue, where applying the machine learning model to the third exception item received from the exception queue produces a first resolution pattern and a first confidence score. Additionally, if the first confidence score exceeds a first confidence threshold, the computing platform may execute, using the processing module, the first resolution pattern, where executing the first resolution pattern comprises modifying one or more data elements of the third exception item based on the machine learning model.

In some embodiments, after executing the first resolution pattern, the computing platform may route, using the processing module, the third exception item to a data source from which the third exception item was received.

In some embodiments, applying the machine learning model to the third exception item received from the exception queue may include identifying the third exception item as resulting from an incorrect amount exception. In some embodiments, applying the machine learning model to the third exception item received from the exception queue may include identifying the third exception item as resulting from a duplicate presentment exception.

In some embodiments, if the first confidence score does not exceed the first confidence threshold, the computing platform may route, using the processing module, the third exception item to a manual review queue.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
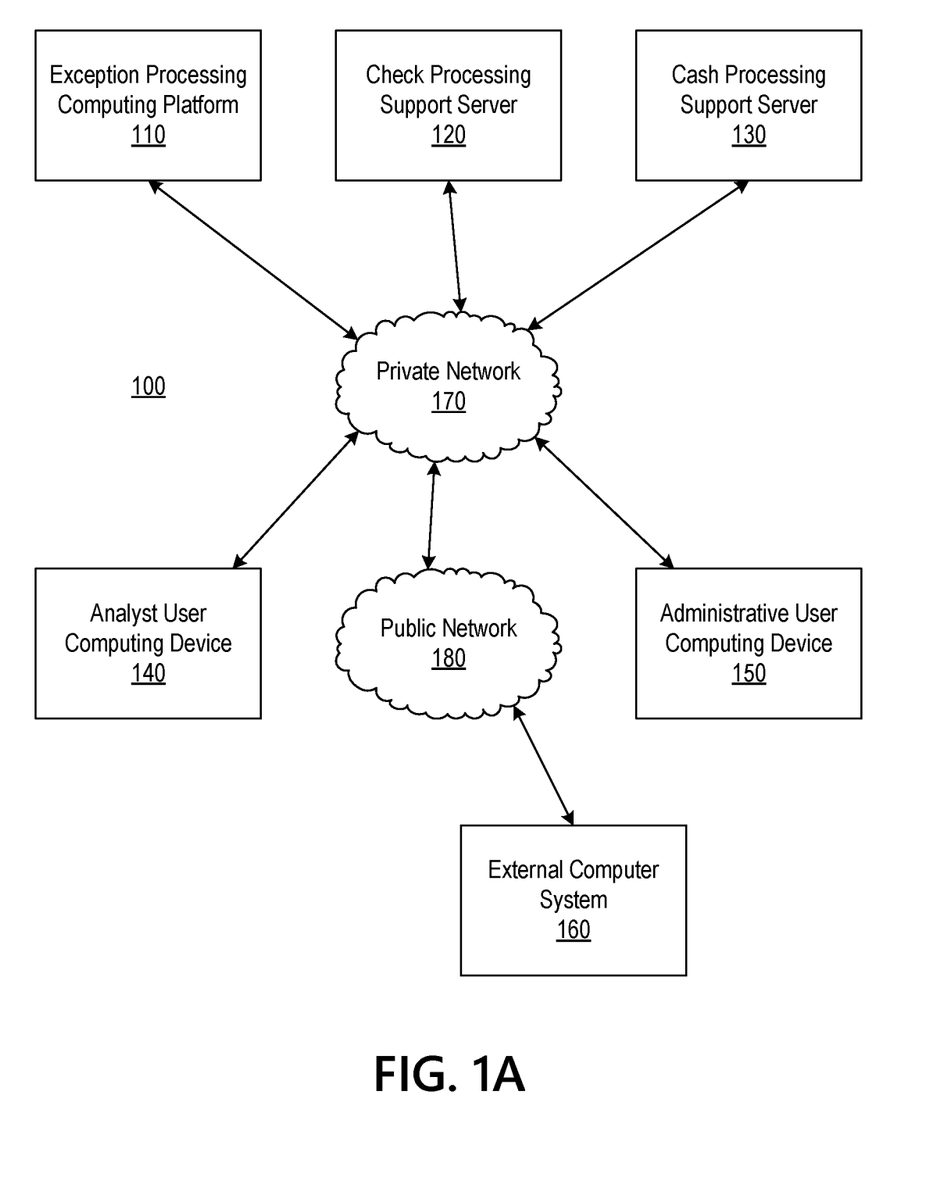
FIGS. 1A and 1B depict an illustrative computing environment for performing enhanced exception processing using cognitive automation tools in accordance with one or more example embodiments.
Figure 1B:
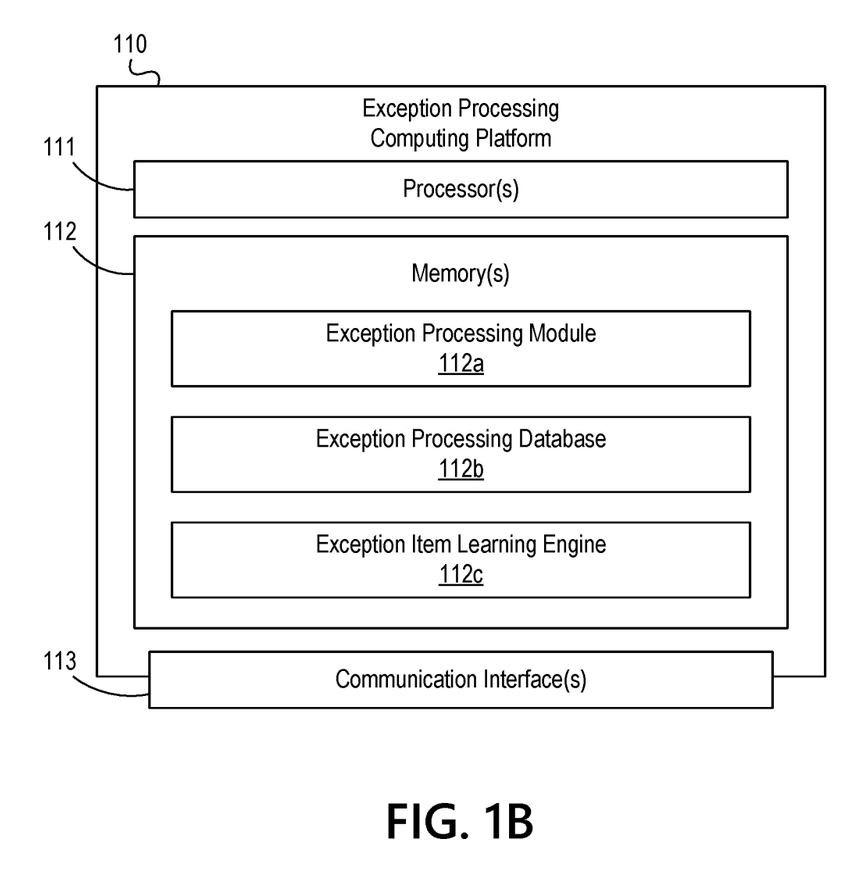

FIGS. 1A and 1B depict an illustrative computing environment for performing enhanced exception processing using cognitive automation tools in accordance with one or more example embodiments. Referring to FIG. 1A, computing environment 100 may include one or more computer systems. For example, computing environment 100 may include an exception processing computing platform 110, a check processing support server 120, a cash processing support server 130, an analyst user computing device 140, an administrative user computing device 150, and an external computer system 160.

As illustrated in greater detail below, exception processing computing platform 110 may include one or more computing devices configured to perform one or more of the functions described herein. For example, exception processing computing platform 110 may include one or more computers (e.g., laptop computers, desktop computers, servers, server blades, or the like).

Check processing support server 120 may include one or more computing devices and/or other computer components (e.g., processors, memories, communication interfaces). In addition, and as illustrated in greater detail below, check processing support server 120 may be configured to interact with and/or otherwise communicate with one or more computing devices and/or other devices (e.g., automated teller machines (ATMs), automated teller assistants (ATAs), customer computing devices, financial center computing devices, and/or the like) which may receive and/or process deposit items, such as checks, being presented for deposit at various locations and/or via various channels (e.g., via an ATM/ATA channel, via a financial center channel, via an online banking channel, via a mobile banking channel, and/or the like).

Cash processing support server 130 also may include one or more computing devices and/or other computer components (e.g., processors, memories, communication interfaces). In addition, and as illustrated in greater detail below, cash processing support server 130 may be configured to interact with and/or otherwise communicate with one or more computing devices and/or other devices (e.g., automated teller machines (ATMs), automated teller assistants (ATAs), customer computing devices, financial center computing devices, and/or the like) which may receive and/or process deposit items, such as cash, being presented for deposit at various locations and/or via various channels (e.g., via an ATM/ATA channel, via a financial center channel, and/or the like).

Analyst user computing device 140 may be a personal computing device (e.g., desktop computer, laptop computer) or mobile computing device (e.g., smartphone, tablet). In addition, analyst user computing device 140 may be linked to and/or used by an enterprise user (who may, e.g., be an employee of a financial institution operating exception processing computing platform 110). For instance, analyst user computing device 140 may be used by an enterprise associate who manually processes and/or reviews deposit items and/or exceptions associated with deposit items.

Administrative user computing device 150 also may be a personal computing device (e.g., desktop computer, laptop computer) or mobile computing device (e.g., smartphone, tablet). In addition, administrative user computing device 150 may be linked to and/or used by an enterprise user (who may, e.g., be an employee of a financial institution operating exception processing computing platform 110). For instance, administrative user computing device 150 may be used by a network administrator or backend enterprise user who monitors and/or configures exception processing computing platform 110 and/or other enterprise computing devices.

External computer system 160 may include one or more computing devices and/or other computer components (e.g., processors, memories, communication interfaces). In addition, and as illustrated in greater detail below, external computer system 160 may be linked to and/or used by an external organization (e.g., an organization different from a financial institution operating exception processing computing platform 110). For instance, external computer system 160 may be used by a third-party financial institution in presenting and/or otherwise submitting one or more deposit items and/or deposit item exceptions to exception processing computing platform 110 and/or a financial institution operating exception processing computing platform 110.

Computing environment 100 also may include one or more networks, which may interconnect one or more of exception processing computing platform 110, check processing support server 120, cash processing support server 130, analyst user computing device 140, administrative user computing device 150, and external computer system 160. For example, computing environment 100 may include a private network 170 (which may, e.g., interconnect exception processing computing platform 110, check processing support server 120, cash processing support server 130, analyst user computing device 140, administrative user computing device 150, and/or one or more other systems which may be associated with an organization, such as a financial institution) and public network 180 (which may, e.g., interconnect external computer system 160 with private network 170 and/or one or more other systems, public networks, sub-networks, and/or the like).

In one or more arrangements, check processing support server 120, cash processing support server 130, analyst user computing device 140, administrative user computing device 150, external computer system 160, and/or the other systems included in computing environment 100 may be any type of computing device capable of receiving a user interface, receiving input via the user interface, and communicating the received input to one or more other computing devices. For example, check processing support server 120, cash processing support server 130, analyst user computing device 140, administrative user computing device 150, external computer system 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of exception processing computing platform 110, check processing support server 120, cash processing support server 130, analyst user computing device 140, administrative user computing device 150, and external computer system 160 may, in some instances, be special-purpose computing devices configured to perform specific functions.

Referring to FIG. 1B, exception processing computing platform 110 may include one or more processor(s) 111, memory(s) 112, and communication interface(s) 113. A data bus may interconnect processor 111, memory 112, and communication interface 113. Communication interface 113 may be a network interface configured to support communication between exception processing computing platform 110 and one or more networks (e.g., network 170, network 180, or the like). Memory 112 may include one or more program modules and/or processing engines having instructions that when executed by processor 111 cause exception processing computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of exception processing computing platform 110 and/or by different computing devices that may form and/or otherwise make up exception processing computing platform 110. For example, memory 112 may have, store, and/or include an exception processing module 112a, an exception processing database 112b, and an exception item learning engine 112c.

Exception processing module 112a may have instructions that direct and/or cause exception processing computing platform 110 to perform enhanced exception processing using cognitive automation tools, as discussed in greater detail below. Exception processing database 112b may store information used by exception processing computing platform 110 in performing enhanced exception processing using cognitive automation tools. Exception item learning engine 112c may perform and/or provide one or more cognitive automation and/or machine learning functions and/or services, as illustrated in greater detail below.

Figure 2A:
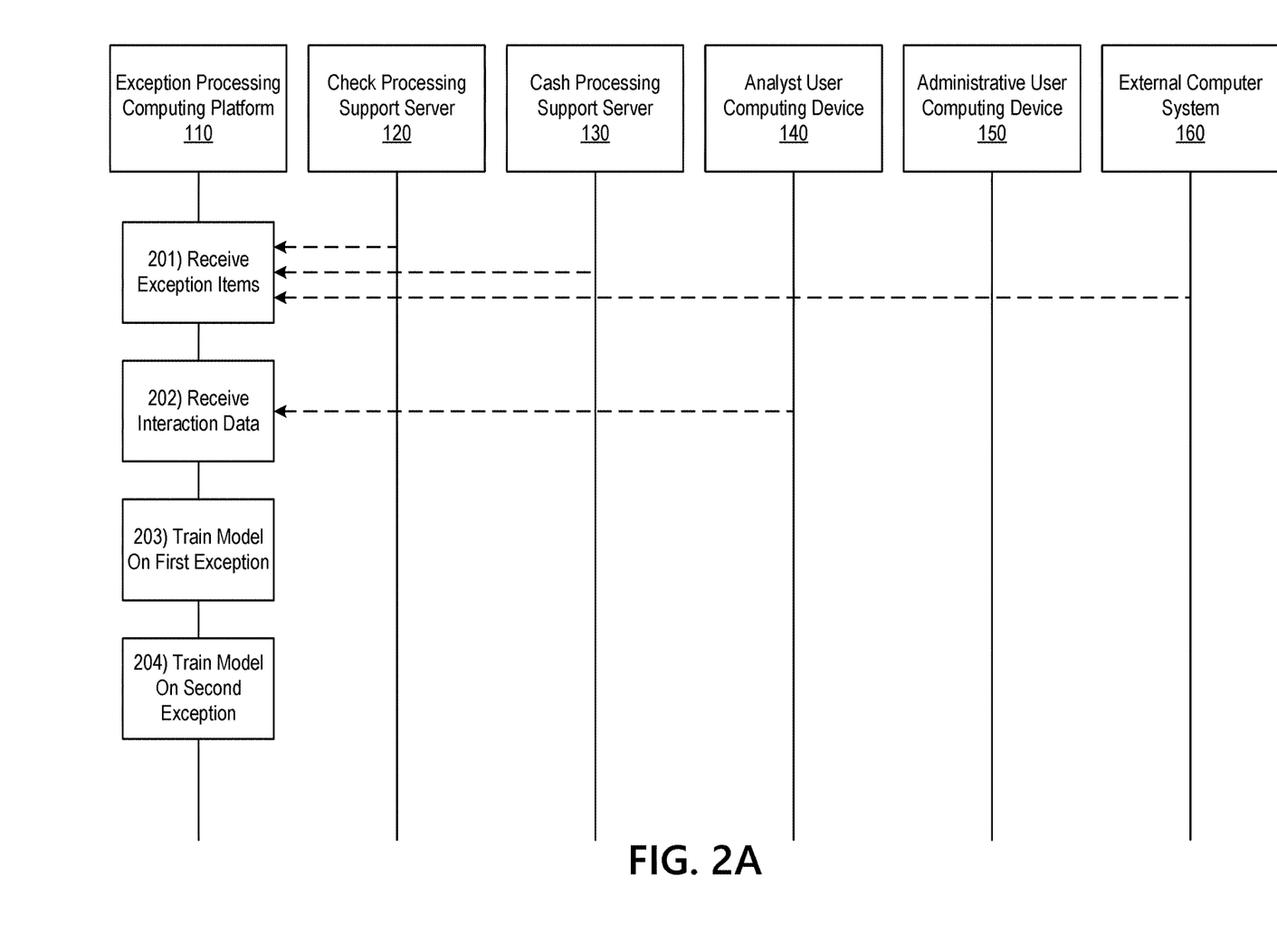
FIGS. 2A-2C depict an illustrative event sequence for performing enhanced exception processing using cognitive automation tools in accordance with one or more example embodiments.
Figure 2B:
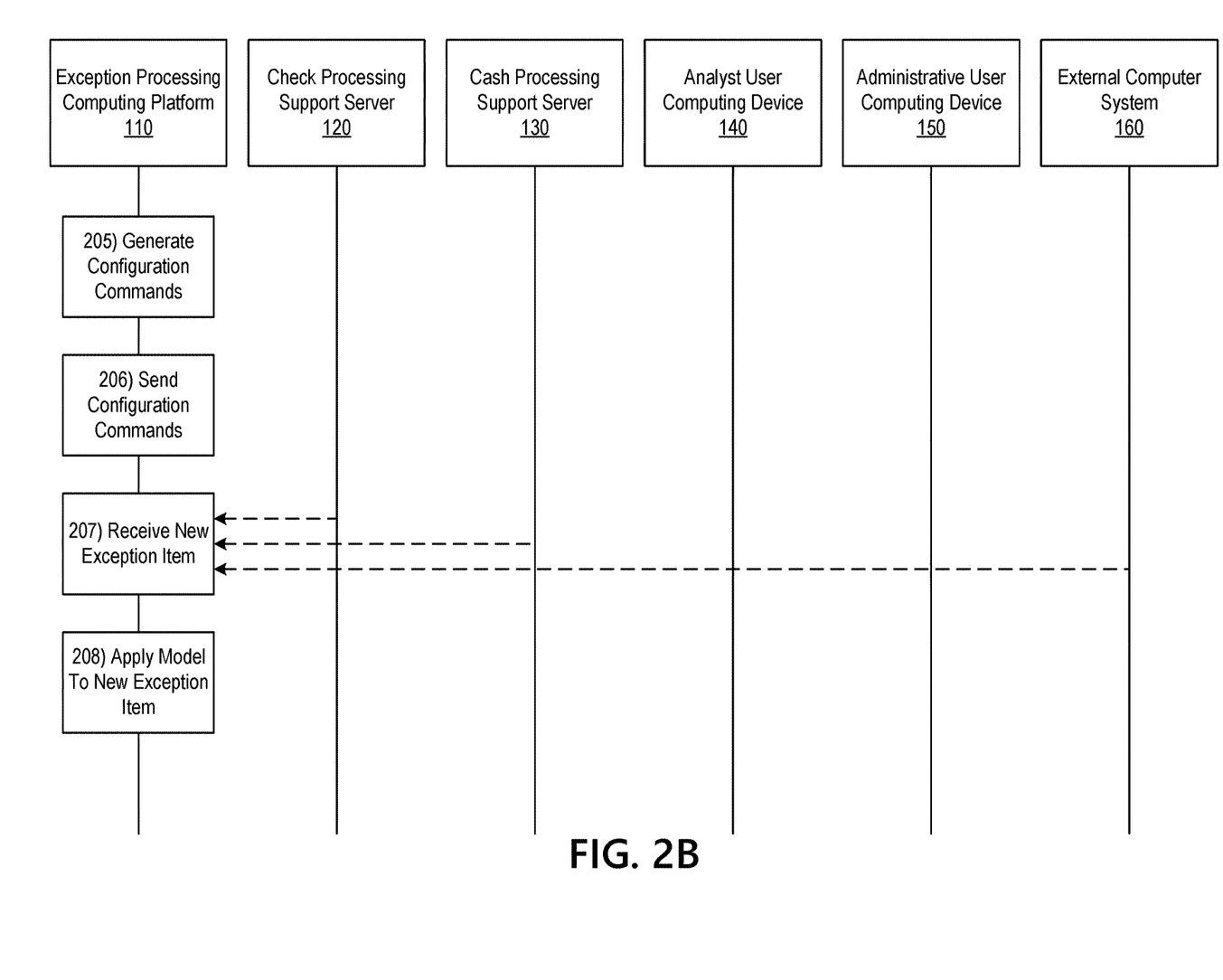
Figure 2C:
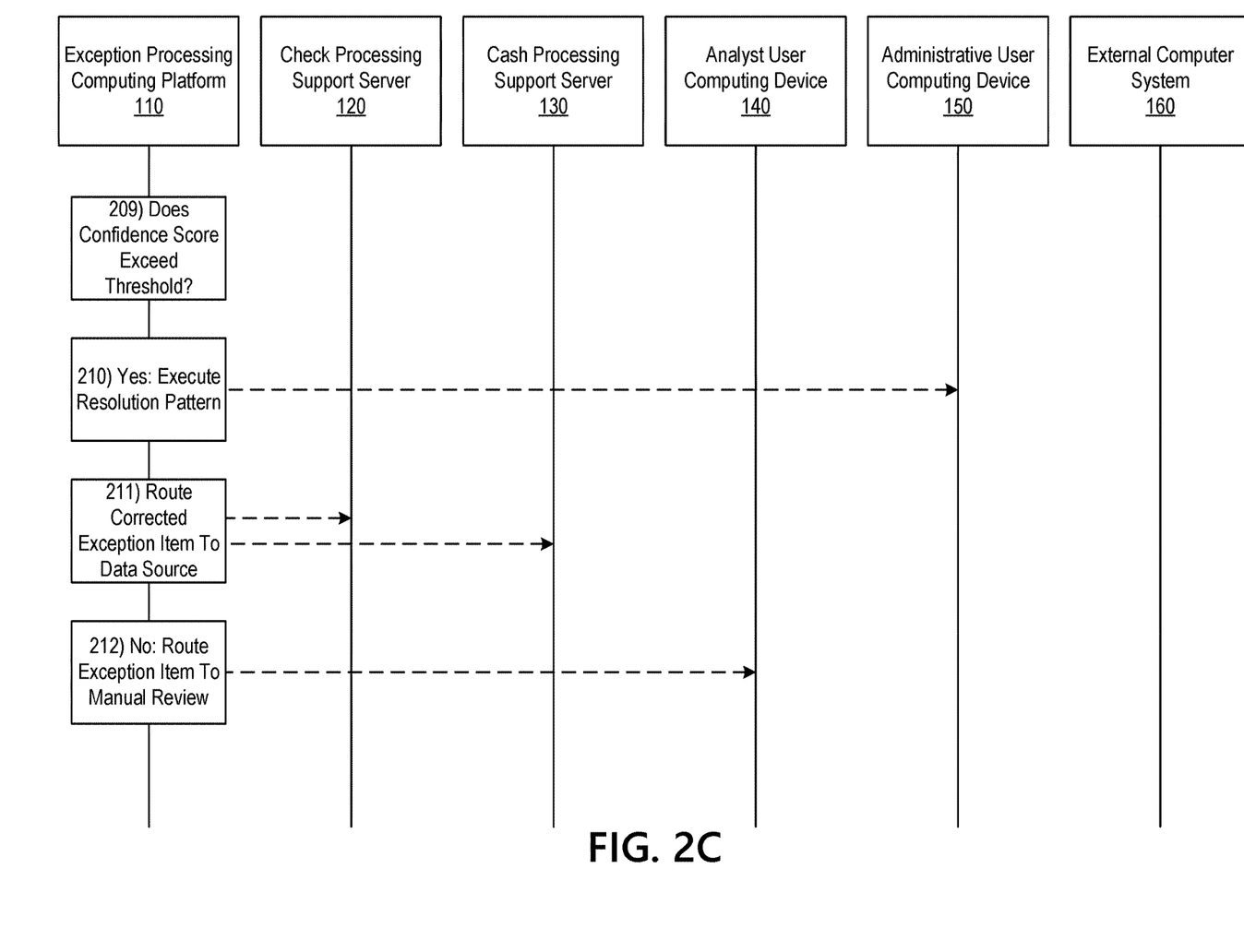

FIGS. 2A-2C depict an illustrative event sequence for performing enhanced exception processing using cognitive automation tools in accordance with one or more example embodiments. Referring to FIG. 2A, at step 201, exception processing computing platform 110 may receive information identifying one or more exception items. For example, at step 201, exception processing computing platform 110 may receive information identifying one or more exception items from one or more of check processing support server 120, cash processing support server 130, and/or external computer system 160. In some instances, exception items may be deposit items that cannot be processed using typical deposit item processing logic and/or systems. The information received at step 201 may, for instance, identify data that was received from one or more internal and/or external data sources in connection with one or more exception items. In addition, the information received at step 201 may, for instance, identify one or more data elements that may be missing and/or erroneous (and which may, e.g., cause the underlying exception(s)) and/or one or more reason codes indicating why the typical deposit item processing logic and/or systems could not process the one or more exception items. Additionally or alternatively, the one or more exception items received by exception processing computing platform 110 may be added (e.g., by exception processing computing platform 110) to an exception queue maintained by exception processing computing platform 110, and such an exception queue may be a temporally-ordered and/or importance-ranked list of exception items waiting to be processed by exception processing computing platform 110 and/or other systems associated with a financial institution operating exception processing computing platform 110.

At step 202, exception processing computing platform 110 may receive interaction data associated with the one or more exception items. For example, at step 202, exception processing computing platform 110 may receive, via the communication interface (e.g., communication interface 113), from at least one analyst user computing device (e.g., analyst user computing device 140), interaction data identifying one or more actions performed by one or more users of the at least one analyst user computing device (e.g., analyst user computing device 140) in resolving a plurality of exception items associated with an exception queue (e.g., the exception queue maintained by exception processing computing platform 110).

In some embodiments, receiving the interaction data identifying the one or more actions performed by the one or more users of the at least one analyst user computing device in resolving the plurality of exception items associated with the exception queue may include receiving a first portion of interaction data identifying one or more actions performed by the one or more users of the at least one analyst user computing device in resolving one or more check deposit exception items associated with the exception queue. For example, in receiving the interaction data identifying the one or more actions performed by the one or more users of the at least one analyst user computing device (e.g., analyst user computing device 140) in resolving the plurality of exception items associated with the exception queue, exception processing computing platform 110 may receive a first portion of interaction data identifying one or more actions performed by the one or more users of the at least one analyst user computing device (e.g., analyst user computing device 140) in resolving one or more check deposit exception items associated with the exception queue. For instance, such check deposit exception items may include incorrect amount exception items, duplicate presentment exception items, and/or other check-related exception items.

In some embodiments, receiving the interaction data identifying the one or more actions performed by the one or more users of the at least one analyst user computing device in resolving the plurality of exception items associated with the exception queue may include receiving a second portion of interaction data identifying one or more actions performed by the one or more users of the at least one analyst user computing device in resolving one or more cash deposit exception items associated with the exception queue. For example, in receiving the interaction data identifying the one or more actions performed by the one or more users of the at least one analyst user computing device (e.g., analyst user computing device 140) in resolving the plurality of exception items associated with the exception queue, exception processing computing platform 110 may receive a second portion of interaction data identifying one or more actions performed by the one or more users of the at least one analyst user computing device (e.g., analyst user computing device 140) in resolving one or more cash deposit exception items associated with the exception queue. For instance, such cash deposit exception items may include bill-related exception items, coin-related exception items, and/or other cash-related exception items.

At step 203, exception processing computing platform 110 may train a cognitive automation model to recognize and process a first type of exception. For example, at step 203, exception processing computing platform 110 may train, using a learning engine (e.g., learning engine 112c), a machine learning model to resolve a first exception of one or more exceptions based on the interaction data identifying the one or more actions performed by the one or more users of the at least one analyst user computing device (e.g., analyst user computing device 140) in resolving the plurality of exception items associated with the exception queue. For instance, exception processing computing platform 110 may train the machine learning model to recognize specific errors identified in different types of exception items and specific actions and/or modifications made to resolve each of these errors.

In some embodiments, training the machine learning model to resolve the first exception of the one or more exceptions may include monitoring and recording a sequence of steps performed by at least one user of the at least one analyst user computing device in modifying one or more data elements of a first exception item to resolve an incorrect amount exception. For example, in training the machine learning model to resolve the first exception of the one or more exceptions at step 203, exception processing computing platform 110 may monitor and record a sequence of steps performed by at least one user of the at least one analyst user computing device (e.g., analyst user computing device 140) in modifying one or more data elements of a first exception item to resolve an incorrect amount exception. For instance, the first exception item may be a deposit item having an incorrect amount, and exception processing computing platform 110 may monitor and record the sequence of steps performed by the user in correcting the incorrect amount so that the deposit item can be processed (e.g., by exception processing computing platform 110 and/or check processing support server 120).

In some embodiments, training the machine learning model to resolve the first exception of the one or more exceptions may include: after monitoring and recording the sequence of steps performed by the at least one user of the at least one analyst user computing device in modifying the one or more data elements of the first exception item to resolve the incorrect amount exception, updating a trust value of a first data source from which the first exception item was received. For example, in training the machine learning model to resolve the first exception of the one or more exceptions, exception processing computing platform 110 may update a trust value of a first data source from which the first exception item was received (e.g., after monitoring and recording the sequence of steps performed by the at least one user of the at least one analyst user computing device (e.g., analyst user computing device 140) in modifying the one or more data elements of the first exception item to resolve the incorrect amount exception). For instance, if the analyst user of analyst user computing device 140 had to modify a relatively large amount of data that came in from a particular data source (e.g., cash processing support server 130) in resolving the first exception, exception processing computing platform 110 may learn to give relatively less trust to that data source (e.g., cash processing support server 130).

At step 204, exception processing computing platform 110 may train the cognitive automation model to recognize and process a second type of exception. For example, at step 204, exception processing computing platform 110 may train, using the learning engine (e.g., learning engine 112c), the machine learning model to resolve a second exception of the one or more exceptions based on the interaction data identifying the one or more actions performed by the one or more users of the at least one analyst user computing device (e.g., analyst user computing device 140) in resolving the plurality of exception items associated with the exception queue. In addition, the second exception of the one or more exceptions may be different from the first exception of the one or more exceptions. For instance, here again, exception processing computing platform 110 may train the machine learning model to recognize specific errors identified in different types of exception items and specific actions and/or modifications made to resolve each of these errors. At step 204, exception processing computing platform 110 may train the machine learning model to recognize and process a different type of exception item than was recognized, processed, and/or trained at step 203.

In some embodiments, training the machine learning model to resolve the second exception of the one or more exceptions may include monitoring and recording a sequence of steps performed by at least one user of the at least one analyst user computing device in modifying one or more data elements of a second exception item to resolve a duplicate presentment exception. For example, in training the machine learning model to resolve the second exception of the one or more exceptions at step 204, exception processing computing platform 110 may monitor and record a sequence of steps performed by at least one user of the at least one analyst user computing device (e.g., analyst user computing device 140) in modifying one or more data elements of a second exception item to resolve a duplicate presentment exception. For instance, the second exception item may be a deposit item that has been presented for deposit more than once, and exception processing computing platform 110 may monitor and record the sequence of steps performed by the user in correcting the duplicate presentment so that the deposit item can be processed (e.g., by exception processing computing platform 110 and/or check processing support server 120). For instance, exception processing computing platform 110 may monitor and record the sequence of steps performed by the user in determining which entity should be credited with the funds, which entity should be charged back for the duplicate presentment, and/or the like.

In some embodiments, training the machine learning model to resolve the second exception of the one or more exceptions may include: after monitoring and recording the sequence of steps performed by the at least one user of the at least one analyst user computing device in modifying the one or more data elements of the second exception item to resolve the duplicate presentment exception, updating a trust value of a second data source from which the second exception item was received. For example, in training the machine learning model to resolve the second exception of the one or more exceptions, exception processing computing platform 110 may update a trust value of a second data source from which the second exception item was received (e.g., after monitoring and recording the sequence of steps performed by the at least one user of the at least one analyst user computing device in modifying the one or more data elements of the second exception item to resolve the duplicate presentment exception). For if the analyst user of analyst user computing device 140 had to modify a relatively large amount of data that came in from a particular data source (e.g., cash processing support server 130) in resolving the second exception, exception processing computing platform 110 may learn to give relatively less trust to that data source (e.g., cash processing support server 130).

Referring to FIG. 2B, at step 205, exception processing computing platform 110 may generate one or more configuration commands. For example, at step 205, based on training the machine learning model to resolve the first exception of the one or more exceptions and training the machine learning model to resolve the second exception of the one or more exceptions, exception processing computing platform 110 may generate one or more configuration commands directing a processing module (e.g., processing module 112a) to implement the machine learning model to process additional exception items associated with the exception queue.

At step 206, exception processing computing platform 110 may send the one or more configuration commands. For example, at step 206, exception processing computing platform 110 may send, to the processing module (e.g., processing module 112a), the one or more configuration commands directing the processing module (e.g., processing module 112a) to implement the machine learning model to process the additional exception items associated with the exception queue. For instance, after building and/or updating the cognitive automation model (e.g., the machine learning model) based on the interaction data, exception processing computing platform 110 may configure processing module 112a to use the cognitive automation model in automatically processing and/or resolving exception items that remain in the exception queue and/or that are added to the exception queue.

At step 207, exception processing computing platform 110 may receive a new exception item (e.g., from check processing support server 120, cash processing support server 130, external computer system 160). For example, at step 207, after sending the one or more configuration commands directing the processing module (e.g., processing module 112a) to implement the machine learning model to process the additional exception items associated with the exception queue, exception processing computing platform 110 may receive, at the processing module (e.g., processing module 112a), a third exception item from the exception queue. For instance, the third exception item may have been newly added to exception queue since the model was trained and/or since the processing module (e.g., processing module 112a) was configured.

At step 208, exception processing computing platform 110 may apply the cognitive automation model to the new exception item. For example, at step 208, exception processing computing platform 110 may apply, using the processing module (e.g., processing module 112a), the machine learning model to the third exception item received from the exception queue. In addition, by applying the machine learning model to the third exception item received from the exception queue, exception processing computing platform 110 may produce a first resolution pattern and a first confidence score. For instance, the resolution pattern may indicate a sequence and/or pattern of actions to be performed in order to correct the exception associated with the third exception item. The confidence score may, for instance, reflect the degree of confidence in the prediction (e.g., as produced by exception processing computing platform 110 based on the model). In some instances, the confidence score may, for instance, be determined based on the distance between the features of the third exception item and corresponding features of the cognitive automation model.

In some embodiments, applying the machine learning model to the third exception item received from the exception queue may include identifying the third exception item as resulting from an incorrect amount exception. For example, in applying the machine learning model to the third exception item received from the exception queue, exception processing computing platform 110 may identify the third exception item as resulting from an incorrect amount exception.

In some embodiments, applying the machine learning model to the third exception item received from the exception queue may include identifying the third exception item as resulting from a duplicate presentment exception. For example, in applying the machine learning model to the third exception item received from the exception queue, exception processing computing platform 110 may identify the third exception item as resulting from a duplicate presentment exception.

Referring to FIG. 2C, at step 209, exception processing computing platform 110 may determine whether the confidence score exceeds a confidence threshold. For example, at step 209, exception processing computing platform 110 may determine whether the confidence score determined at step 208 through application of the model exceeds a confidence threshold.

At step 210, if the confidence score exceeds the confidence threshold (e.g., at step 209), exception processing computing platform 110 may execute the resolution pattern determined at step 208 through application of the model. For example, at step 210, if the first confidence score exceeds a first confidence threshold, exception processing computing platform 110 may execute, using the processing module (e.g., processing module 112a), the first resolution pattern. In addition, in executing the first resolution pattern, exception processing computing platform 110 may modify one or more data elements of the third exception item based on the machine learning model. For instance, exception processing computing platform 110 may modify one or more data elements of the third exception item based on the machine learning model to correct such data elements and/or enable further processing of the item through normal and/or typical deposit processing channels.

Figure 3:
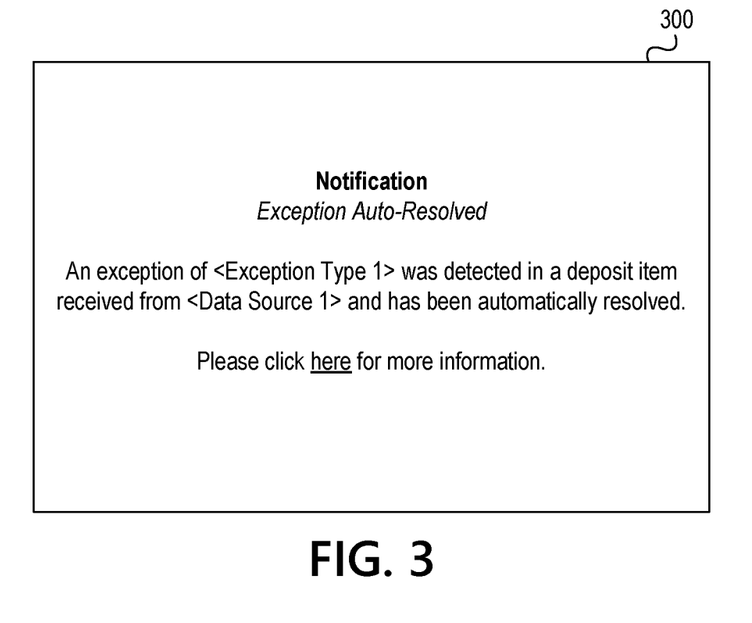
FIGS. 3 and 4 depict example graphical user interfaces for performing enhanced exception processing using cognitive automation tools in accordance with one or more example embodiments.

In some instances, in modifying the one or more data elements of the third exception item based on the machine learning model, exception processing computing platform 110 may cause one or more computing devices (e.g., administrative user computing device 150) to generate, display, and/or otherwise present one or more graphical user interfaces similar to graphical user interface 300, which is illustrated in FIG. 3. As seen in FIG. 3, graphical user interface 300 may include text and/or other information indicating that exception processing computing platform 110 has automatically resolved an exception item (e.g., "An exception of <Exception Type 1> was detected in a deposit item received from <Data Source 1> and has been automatically resolved. Please click here for more information.").

At step 211, exception processing computing platform 110 may route the modified exception item to an appropriate data source for further processing of the corrected item through normal and/or typical deposit processing channels. For example, at step 211, after executing the first resolution pattern, exception processing computing platform 110 may route, using the processing module (e.g., processing module 112a), the third exception item to a data source from which the third exception item was received. For instance, exception processing computing platform 110 may route the third exception item to check processing support server 120, cash processing support server 130, and/or one or more other systems and/or servers. In this way, exception processing computing platform 110 may send the modified and/or corrected item back to the appropriate data source for continued processing through normal and/or typical deposit processing channels.

Figure 4:
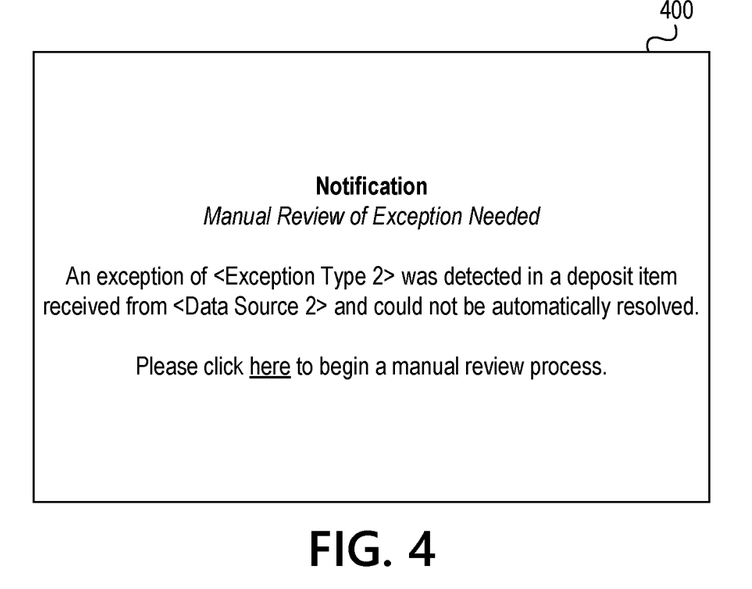

At step 212, if the confidence score does not exceed the confidence threshold (e.g., at step 209), exception processing computing platform 110 may route the exception item to a manual review process. For example, at step 212, if the first confidence score does not exceed the first confidence threshold, exception processing computing platform 110 may route, using the processing module (e.g., processing module 112a), the third exception item to a manual review queue (which may, e.g., be hosted on and/or performed on analyst user computing device 140). In some instances, in routing the third exception item to the manual review queue, exception processing computing platform 110 may cause analyst user computing device 140 to generate, display, and/or otherwise present one or more graphical user interfaces similar to graphical user interface 400, which is illustrated in FIG. 4. As seen in FIG. 4, graphical user interface 400 may include text and/or other information indicating that manual review of an exception item is required (e.g., "An exception of <Exception Type 2> was detected in a deposit item received from <Data Source 2> and could not be automatically resolved. Please click here to begin a manual review process.").

Subsequently, exception processing computing platform 110 may repeat one or more steps of the example event sequence discussed above and/or perform other steps. For example, exception processing computing platform 110 may repeat one or more steps of the example event sequence discussed above and/or perform other steps in processing one or more additional exception items, updating one or more models, and/or performing other functions.

Figure 5:
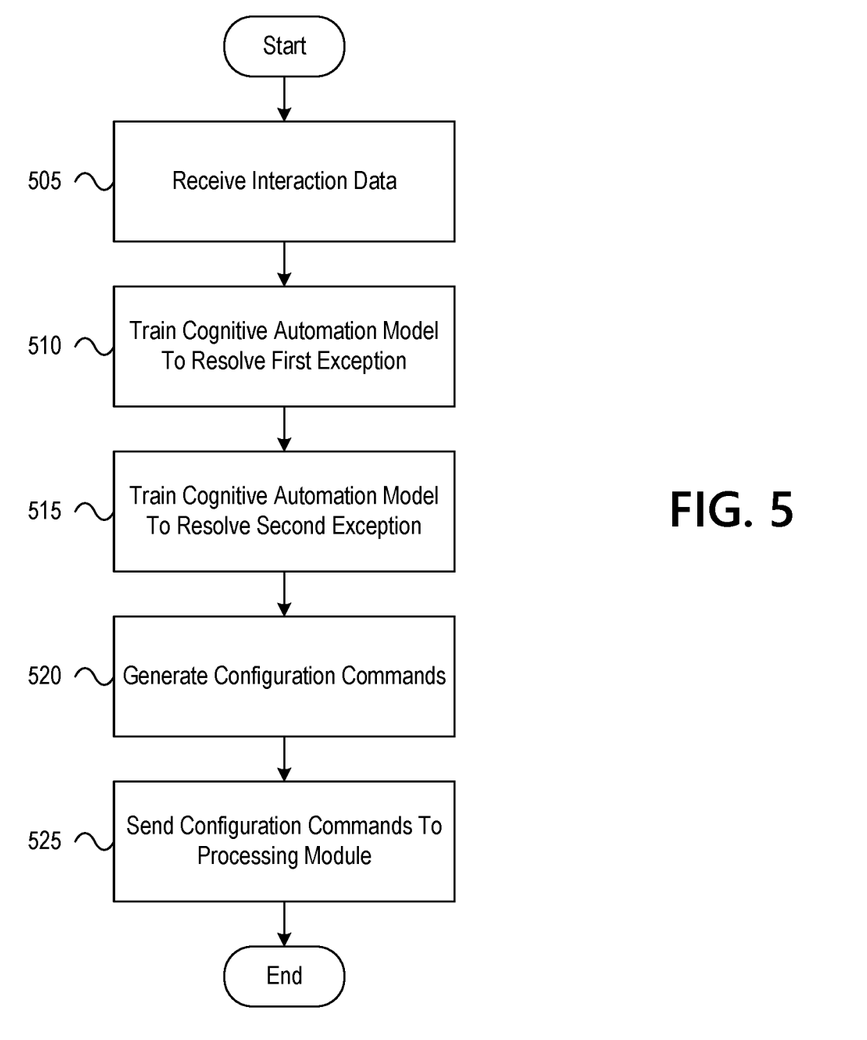
FIG. 5 depicts an illustrative method for performing enhanced exception processing using cognitive automation tools in accordance with one or more example embodiments.

FIG. 5 depicts an illustrative method for performing enhanced exception processing using cognitive automation tools in accordance with one or more example embodiments. Referring to FIG. 5, at step 505, a computing platform having at least one processor, a communication interface, and memory may receive, via the communication interface, from at least one analyst user computing device, interaction data identifying one or more actions performed by one or more users of the at least one analyst user computing device in resolving a plurality of exception items associated with an exception queue. At step 510, the computing platform may train, using a learning engine, a machine learning model to resolve a first exception of one or more exceptions based on the interaction data identifying the one or more actions performed by the one or more users of the at least one analyst user computing device in resolving the plurality of exception items associated with the exception queue.

At step 515, the computing platform may train, using the learning engine, the machine learning model to resolve a second exception of the one or more exceptions based on the interaction data identifying the one or more actions performed by the one or more users of the at least one analyst user computing device in resolving the plurality of exception items associated with the exception queue, where the second exception of the one or more exceptions is different from the first exception of the one or more exceptions. At step 520, based on training the machine learning model to resolve the first exception of the one or more exceptions and training the machine learning model to resolve the second exception of the one or more exceptions, the computing platform may generate one or more configuration commands directing a processing module to implement the machine learning model to process additional exception items associated with the exception queue. At step 525, the computing platform may send, to the processing module, the one or more configuration commands directing the processing module to implement the machine learning model to process the additional exception items associated with the exception queue.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from at least one analyst user computing device, interaction data identifying one or more actions performed by one or more users of the at least one analyst user computing device in resolving a plurality of exception items associated with an exception queue;
   train, using a learning engine, a machine learning model to resolve a first exception of one or more exceptions based on the interaction data identifying the one or more actions performed by the one or more users of the at least one analyst user computing device in resolving the plurality of exception items associated with the exception queue;
   train, using the learning engine, the machine learning model to resolve a second exception of the one or more exceptions based on the interaction data identifying the one or more actions performed by the one or more users of the at least one analyst user computing device in resolving the plurality of exception items associated with the exception queue, wherein the second exception of the one or more exceptions is different from the first exception of the one or more exceptions;
   based on training the machine learning model to resolve the first exception of the one or more exceptions and training the machine learning model to resolve the second exception of the one or more exceptions, generate one or more configuration commands directing a processing module to implement the machine learning model to process additional exception items associated with the exception queue;
   send, to the processing module, the one or more configuration commands directing the processing module to implement the machine learning model to process the additional exception items associated with the exception queue;
   after sending the one or more configuration commands directing the processing module to implement the machine learning model to process the additional exception items associated with the exception queue, receive, at the processing module, a third exception item from the exception queue;
   apply, using the processing module, the machine learning model to the third exception item received from the exception queue, wherein applying the machine learning model to the third exception item received from the exception queue produces a first resolution pattern and a first confidence score; and
   if the first confidence score exceeds a first confidence threshold, execute, using the processing module, the first resolution pattern, wherein executing the first resolution pattern comprises modifying one or more data elements of the third exception item based on the machine learning model.

2. The computing platform of claim 1, wherein receiving the interaction data identifying the one or more actions performed by the one or more users of the at least one analyst user computing device in resolving the plurality of exception items associated with the exception queue comprises receiving a first portion of interaction data identifying one or more actions performed by the one or more users of the at least one analyst user computing device in resolving one or more check deposit exception items associated with the exception queue.

3. The computing platform of claim 1, wherein receiving the interaction data identifying the one or more actions performed by the one or more users of the at least one analyst user computing device in resolving the plurality of exception items associated with the exception queue comprises receiving a second portion of interaction data identifying one or more actions performed by the one or more users of the at least one analyst user computing device in resolving one or more cash deposit exception items associated with the exception queue.

4. The computing platform of claim 1, wherein training the machine learning model to resolve the first exception of the one or more exceptions comprises monitoring and recording a sequence of steps performed by at least one user of the at least one analyst user computing device in modifying one or more data elements of a first exception item to resolve an incorrect amount exception.

5. The computing platform of claim 4, wherein training the machine learning model to resolve the first exception of the one or more exceptions comprises:
   after monitoring and recording the sequence of steps performed by the at least one user of the at least one analyst user computing device in modifying the one or more data elements of the first exception item to resolve the incorrect amount exception, updating a trust value of a first data source from which the first exception item was received.

6. The computing platform of claim 1, wherein training the machine learning model to resolve the second exception of the one or more exceptions comprises monitoring and recording a sequence of steps performed by at least one user of the at least one analyst user computing device in modifying one or more data elements of a second exception item to resolve a duplicate presentment exception.

7. The computing platform of claim 6, wherein training the machine learning model to resolve the second exception of the one or more exceptions comprises:
   after monitoring and recording the sequence of steps performed by the at least one user of the at least one analyst user computing device in modifying the one or more data elements of the second exception item to resolve the duplicate presentment exception, updating a trust value of a second data source from which the second exception item was received.

8. The computing platform of claim 1, wherein the memory stores additional computer-readable instructions that, when executed by the at least one processor, cause the computing platform to:
   after executing the first resolution pattern, route, using the processing module, the third exception item to a data source from which the third exception item was received.

9. The computing platform of claim 1, wherein applying the machine learning model to the third exception item received from the exception queue comprises identifying the third exception item as resulting from an incorrect amount exception.

10. The computing platform of claim 1, wherein applying the machine learning model to the third exception item received from the exception queue comprises identifying the third exception item as resulting from a duplicate presentment exception.

11. The computing platform of claim 1, wherein the memory stores additional computer-readable instructions that, when executed by the at least one processor, cause the computing platform to:
   if the first confidence score does not exceed the first confidence threshold, route, using the processing module, the third exception item to a manual review queue.

12. A method, comprising:
   at a computing platform comprising at least one processor, a communication interface, and memory:
      receiving, by the at least one processor, via the communication interface, from at least one analyst user computing device, interaction data identifying one or more actions performed by one or more users of the at least one analyst user computing device in resolving a plurality of exception items associated with an exception queue;
      training, by the at least one processor, using a learning engine, a machine learning model to resolve a first exception of one or more exceptions based on the interaction data identifying the one or more actions performed by the one or more users of the at least one analyst user computing device in resolving the plurality of exception items associated with the exception queue;
      training, by the at least one processor, using the learning engine, the machine learning model to resolve a second exception of the one or more exceptions based on the interaction data identifying the one or more actions performed by the one or more users of the at least one analyst user computing device in resolving the plurality of exception items associated with the exception queue, wherein the second exception of the one or more exceptions is different from the first exception of the one or more exceptions;
      based on training the machine learning model to resolve the first exception of the one or more exceptions and training the machine learning model to resolve the second exception of the one or more exceptions, generating, by the at least one processor, one or more configuration commands directing a processing module to implement the machine learning model to process additional exception items associated with the exception queue;
      sending, by the at least one processor, to the processing module, the one or more configuration commands directing the processing module to implement the machine learning model to process the additional exception items associated with the exception queue;
      after sending the one or more configuration commands directing the processing module to implement the machine learning model to process the additional exception items associated with the exception queue, receiving, at the processing module, a third exception item from the exception queue;
      applying, using the processing module, the machine learning model to the third exception item received from the exception queue, wherein applying the machine learning model to the third exception item received from the exception queue produces a first resolution pattern and a first confidence score; and
      if the first confidence score exceeds a first confidence threshold, executing, using the processing module, the first resolution pattern, wherein executing the first resolution pattern comprises modifying one or more data elements of the third exception item based on the machine learning model.

13. The method of claim 12, wherein receiving the interaction data identifying the one or more actions performed by the one or more users of the at least one analyst user computing device in resolving the plurality of exception items associated with the exception queue comprises receiving a first portion of interaction data identifying one or more actions performed by the one or more users of the at least one analyst user computing device in resolving one or more check deposit exception items associated with the exception queue.

14. The method of claim 12, wherein receiving the interaction data identifying the one or more actions performed by the one or more users of the at least one analyst user computing device in resolving the plurality of exception items associated with the exception queue comprises receiving a second portion of interaction data identifying one or more actions performed by the one or more users of the at least one analyst user computing device in resolving one or more cash deposit exception items associated with the exception queue.

15. The method of claim 12, wherein training the machine learning model to resolve the first exception of the one or more exceptions comprises monitoring and recording a sequence of steps performed by at least one user of the at least one analyst user computing device in modifying one or more data elements of a first exception item to resolve an incorrect amount exception.

16. The method of claim 15, wherein training the machine learning model to resolve the first exception of the one or more exceptions comprises:
   after monitoring and recording the sequence of steps performed by the at least one user of the at least one analyst user computing device in modifying the one or more data elements of the first exception item to resolve the incorrect amount exception, updating a trust value of a first data source from which the first exception item was received.

17. The method of claim 12, wherein training the machine learning model to resolve the second exception of the one or more exceptions comprises monitoring and recording a sequence of steps performed by at least one user of the at least one analyst user computing device in modifying one or more data elements of a second exception item to resolve a duplicate presentment exception.

18. The method of claim 17, wherein training the machine learning model to resolve the second exception of the one or more exceptions comprises:
   after monitoring and recording the sequence of steps performed by the at least one user of the at least one analyst user computing device in modifying the one or more data elements of the second exception item to resolve the duplicate presentment exception, updating a trust value of a second data source from which the second exception item was received.

19. One or more non-transitory computer-readable media storing instructions that, when executed by a computing platform comprising at least one processor, a communication interface, and memory, cause the computing platform to:
   receive, via the communication interface, from at least one analyst user computing device, interaction data identifying one or more actions performed by one or more users of the at least one analyst user computing device in resolving a plurality of exception items associated with an exception queue;
   train, using a learning engine, a machine learning model to resolve a first exception of one or more exceptions based on the interaction data identifying the one or more actions performed by the one or more users of the at least one analyst user computing device in resolving the plurality of exception items associated with the exception queue;
   train, using the learning engine, the machine learning model to resolve a second exception of the one or more exceptions based on the interaction data identifying the one or more actions performed by the one or more users of the at least one analyst user computing device in resolving the plurality of exception items associated with the exception queue, wherein the second exception of the one or more exceptions is different from the first exception of the one or more exceptions;
   based on training the machine learning model to resolve the first exception of the one or more exceptions and training the machine learning model to resolve the second exception of the one or more exceptions, generate one or more configuration commands directing a processing module to implement the machine learning model to process additional exception items associated with the exception queue;
   send, to the processing module, the one or more configuration commands directing the processing module to implement the machine learning model to process the additional exception items associated with the exception queue;
   after sending the one or more configuration commands directing the processing module to implement the machine learning model to process the additional exception items associated with the exception queue, receive, at the processing module, a third exception item from the exception queue;
   apply, using the processing module, the machine learning model to the third exception item received from the exception queue, wherein applying the machine learning model to the third exception item received from the exception queue produces a first resolution pattern and a first confidence score; and
   if the first confidence score exceeds a first confidence threshold, execute, using the processing module, the first resolution pattern, wherein executing the first resolution pattern comprises modifying one or more data elements of the third exception item based on the machine learning model.

\* \* \* \* \*